Feb. 11, 1930.　　　M. GLASSNER　　　1,746,252
EXTRACTOR FOR MOLDED ARTICLES
Filed April 7, 1925
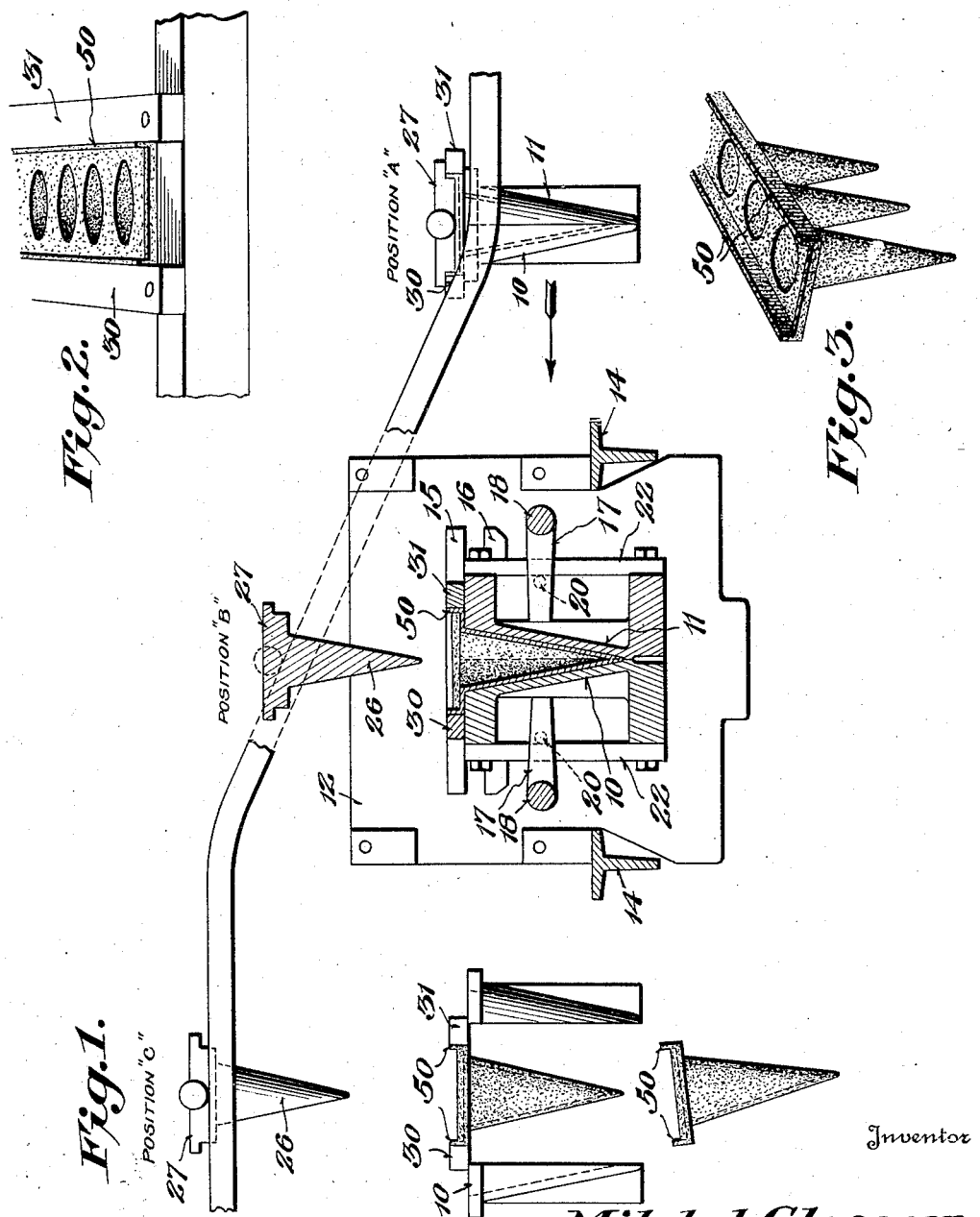
Inventor
Mitchel Glassner,
By H. H. Snelling
Attorney Patented Feb. 11, 1930

1,746,252

UNITED STATES PATENT OFFICE

MITCHEL GLASSNER, OF BALTIMORE, MARYLAND, ASSIGNOR OF ONE-HALF TO MARYLAND BAKING COMPANY, OF BALTIMORE, MARYLAND, A COPARTNERSHIP COMPOSED OF ISAAC SHAPIRO AND JOSEPH SHAPIRO, AND ONE-HALF TO THE BES-CONE COMPANY, OF BALTIMORE, MARYLAND, A CORPORATION OF MARYLAND

EXTRACTOR FOR MOLDED ARTICLES

Application filed April 7, 1925. Serial No. 21,398.

This invention relates to pastry baking machines and has for its principal object the provision of an efficient method of removing pastry articles from the forms in which they are baked.

A further object of the present invention relates to the provision of a simple and efficient device for removing baked ice cream cones from their molds, such device improving the quality of the baked cones by limiting the free expansion of the batter during the process of baking and thereby causing it to densify. A still further object of the present invention is to the provision of a single means for simultaneously cleaning one of the surfaces of the molds and extracting the cones from the mold.

In the drawings Figure 1 represents quite diagrammatically a portion of a machine for baking ice cream cones.

Figure 2 is a perspective view of the device showing the position of the baked excess batter usually called "waste" in the baking art, in spite of its ready sale as an ingredient of various animal feed preparations.

Figure 3 shows in perspective a series of baked cones and the integral channel shaped flange of waste.

While my invention is applicable to many other uses it will probably find its most general employment in connection with ovens for baking ice cream cones and it is therefore so illustrated and described although the invention itself should be considered as limited only as called for in the claims.

Ice cream cone baking machines are well-known and old and a detailed description of them in this application is deemed unnecessary. In the type of baking machine illustrated a plurality of molds each consisting of two similar cooperating castings 10 and 11 are carried in a large rotating frame or wheel so that each of the molds pass in sequence, a filling device; heating mechanism, usually gas burners; mold operating devices, opening the molds at the proper time; core removing devices; and finally a station at which the molded and baked cones are removed. The present invention has to do solely with the step of removing the baked cone from the molds, and the damming of the flow of the expanding batter.

For a complete understanding of the invention I have shown the mold at position B of Figure 1 in cross-section. The element 12 is the outer head which is bolted to the radially extending T-irons 14 and together with a smaller inner head supports the mold halves 10 and 11 which slide between parallel shelves 15 and 16, the castings being reciprocated by means of arms 17 on rock shafts 18 operated by mechanism lying outside the outer head. These arms 17 carry pins such as 20 which engage slats 22 fast to the mold sections so as to open the mold at the proper time and as shown in position C.

The cores 26 are preferably six in number on each core holder 27 which latter rests bodily on the top of the upper flat surface of the two molds sections resting by gravity during part of the travel of the large wheel or frame but usually being spring-pressed during certain stages of the baking. The parts so far described are old and well-known, and are well illustrated in the Shapiro Patent #1,460,611, granted July 3, 1923, and the present invention may be considered as an improvement on that machine.

In using the machine each cavity of each mold receives a charge of batter which due to the residual heat expands upward in the molding cavities and about the cores 26 which are inserted in the mold cavities immediately after the filling or charge receiving. The batter soon fills the entire space between the core and mold and the excess travels horizontally over the top surface of the mold sections forming an irregular rectangle having its sides scalloped with the cusps between the adjacent mold cavities, this excess batter or waste gradually thinning towards the edges of the rectangle.

The present improvement consists in part in limiting the travel of this excess batter. The main agent for such restriction is a plurality of straight steel bars or strips 30 and 31 fast at either end to the outer and inner heads respectively, being secured to the upper edge of the inner head and to the ledge or shelf 15 of the outer head. These two bars which serve the dual functions of mold cleaners and cone extractors fit the top surfaces of the mold sections as snug as possible and to such an extent that the batter can not seep between the strips and the molds.

The two bars 30 and 31 are spaced a sufficient distance apart to receive somewhat snugly between them the core carrying bar or holder 27, the fit naturally being such as to provide working clearance and therefore it is possible for the batter to work its way somewhat upwardly between the extractor strips 30 and 31 and the core holder 27. Even though the batter should creep somewhat between the core holder and the bars or strips 30 and 31 the latter nevertheless serve to limit the flow of batter and to thicken it, this producing a better cone than it is possible to produce in absence of these members.

In practice it is found that the presence of these batter limiting, cone extractor bars permits a closer control of the batter feed means and effects a saving of batter as it is possible to control to a great nicety the outward travel of the batter, and therefore insure against thin spots in the cones without having excess waste.

In Figure 1, at position A the mold sections are shown closed and the cores are still within the mold sections. Usually just before reaching this position, the molds have been slightly opened and then closed to free the cone from the molds and if desired the core may be removed slightly from the cone and then replaced. These steps while somewhat common have no relation however to the present invention and may be omitted with ordinary batter. In position B the cores have been entirely removed from the cones which are resting within the two closed sections 10 and 11.

It will be noted that the two extractor bars are relatively immovable and that the two mold sections slide beneath them. The edge of the waste 50 therefore engages the strips instantly upon the molds being opened and the two strips together hold the entire cone-waste assembly centrally positioned so that when the molds are opened to their widest extent as in position C the cone-waste assembly if it could possibly stick would be held in the position shown exactly central of the two molds.

As a matter of fact in practice a mechanical knock-out passes between the extractor strips 30 and 31 in this position so as to remove any cone or part of cone that should by any chance stick or hang in the molds or to the strips. As previously cited the clearance between the top surface of the molds and the extractor strips is such as to allow the strips to clean the top of the mold surfaces in addition to its limiting the flow of batter and therefore through restricting the freedom of the batter to escape producing a superior cone, by insuring perfect walls of the cone itself, that is, walls free from the thin spots which form when it is attempted to minimize the quantity of batter delivered while permitting the dough freedom to escape laterally at the top of the mold.

A very important feature of the present invention is the great strength imparted to the gang or batch of cones as they are baked. It will be noted from Figure 3 that all of the cones are integral with the waste, and that the latter consists of a horizontal sheet having vertical side flanges on the two parallel, long sides, so that the waste is in the form of a rolled steel channel section, possessing the same advantages of relative strength over and above that possessed by a similar flat plate.

By virtue of this channel shape given to the waste the entire baked mass moves out of the molds as a unit, and the tendency, so familiar with the older types of cone removing devices, of the cones to break apart when one or more of them adheres to its respective mold section, is entirely eliminated. A still further advantage is that by so strengthening the waste it is possible to have more than six cones in each batch.

What I claim is:—

1. In a device for making ice cream cones, a plurality of half mold sections arranged in pairs, the half sections of each pair being movable toward and away from the other, a bar adjacent to and substantially touching each half mold section of each pair, means for slidably supporting all of said movable sections and for rigidly mounting all of said bars, and a plurality of core holders each having a plurality of cores thereon equal in number to the number of conical cavities in each pair of sections, said core holders and said cores being of size to provide a space of substantially uniform thickness between the conical cavities of the molds and the conical surfaces of the cores, the plane top surfaces of each half mold section and the plane bottom surfaces of each holder, and between the vertical walls of said bars and the holder whereby a baked mass of pastry is formed consisting of a plurality of cones and a channel shaped waste section integral with each of said cones.

2. A baked mass of pastry, consisting of a plurality of cones and an integral waste portion, said waste portion being channel shaped to increase its resistance to rupture.

3. A baked mass of pastry, consisting of a plurality of ice cream cones and a waste portion integral with all of the cones, said waste portion being channel shaped and having a well defined edge to each of the side flanges of the channel.

4. A baked mass of pastry, consisting of a plurality of ice cream cones and a waste portion integral with all of the cones, said waste portion including a plane body of sharply rectangular form into which each of the cones opens and having a flange along each of its longitudinal edges.

5. In an ice cream cone baking machine, a sectional mold having a plurality of conical baking cavities, a core bar having a plurality of vertically disposed cores thereon cooperating with said baking cavities to produce baked cones, a horizontal flange extending laterally from said bar at each side, a pair of horizontal dam strips paralleling the line of cavities at each side and substantially touching the mold sections and the lateral flanges of the bar when the parts are in baking position, said parts being so proportioned as to leave a baking space of uniform thickness between the sides of the bar and the inner edges of the strips, the bottom surface of the bar and the top surface of the mold section, and the conical surfaces of the cores and the cavities.

In testimony whereof I affix my signature.

MITCHEL GLASSNER.